United States Patent
Xiao et al.

(10) Patent No.: US 12,145,886 B2
(45) Date of Patent: Nov. 19, 2024

(54) RECYCLED POWDER CONCRETE FOR 3D PRINTING CONSTRUCTION AND PREPARATION METHOD THEREFOR

(71) Applicant: TONGJI UNIVERSITY, Shanghai (CN)

(72) Inventors: Jianzhuang Xiao, Shanghai (CN); Zhiming Ma, Shanghai (CN); Zhenhua Duan, Shanghai (CN); Jiangtao Yu, Shanghai (CN); Tao Ding, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 784 days.

(21) Appl. No.: 17/053,799

(22) PCT Filed: Jan. 23, 2019

(86) PCT No.: PCT/CN2019/072847
§ 371 (c)(1),
(2) Date: Nov. 9, 2020

(87) PCT Pub. No.: WO2020/029550
PCT Pub. Date: Feb. 13, 2020

(65) Prior Publication Data
US 2021/0261461 A1    Aug. 26, 2021

(30) Foreign Application Priority Data

Aug. 10, 2018  (CN) .......................... 201810909189.4

(51) Int. Cl.
| | | |
|---|---|---|
| *C04B 28/04* | (2006.01) |
| *B28B 1/00* | (2006.01) |
| *B33Y 70/10* | (2020.01) |
| *C04B 14/30* | (2006.01) |
| *C04B 16/06* | (2006.01) |
| *C04B 18/16* | (2023.01) |
| *B82Y 40/00* | (2011.01) |
| *C04B 111/00* | (2006.01) |

(52) U.S. Cl.
CPC .............. *C04B 28/04* (2013.01); *B28B 1/001* (2013.01); *B33Y 70/10* (2020.01); *C04B 14/305* (2013.01); *C04B 16/0625* (2013.01); *C04B 18/16* (2013.01); *B82Y 40/00* (2013.01); *C04B 2111/00181* (2013.01)

(58) Field of Classification Search
CPC ... C04B 14/06; C04B 14/305; C04B 16/0625; C04B 18/16; C04B 2103/0057; C04B 2103/10; C04B 2111/00181; C04B 24/2647; C04B 24/383; C04B 28/04; C04B 12/04; C04B 2103/302; C04B 22/064; C04B 24/26; C04B 24/2688; C04B 28/02; Y02W 30/91; B82Y 40/00; B82Y 30/00; B28B 1/001; B33Y 70/10; B33Y 70/00
See application file for complete search history.

(56) References Cited

FOREIGN PATENT DOCUMENTS

| | | | | |
|---|---|---|---|---|
| CN | 107500687 A | 12/2017 | | |
| CN | 108147742 A | 6/2018 | | |
| CN | 108178582 A | * 6/2018 | ............. | B28B 1/001 |
| CN | 108314375 A | * 7/2018 | ............. | C04B 18/16 |
| CN | 109095836 A | 12/2018 | | |
| CN | 108314375 B | * 12/2020 | ............. | C04B 18/16 |
| KR | 101620074 B1 | 5/2016 | | |
| WO | WO 2013043908 A1 | 3/2013 | | |

OTHER PUBLICATIONS

"Portland Cement Paste Modified by TiO2 Nanoparticles: A Microstructure Perspective" to Feng et al. Ind. Eng. Chem. Res. 2013, 52, 33, 11575-11582 Publication Date:Jul. 22, 2013.*

* cited by examiner

Primary Examiner — Shuangyi Abu Ali
(74) Attorney, Agent, or Firm — IPRTOP LLC

(57) ABSTRACT

The present disclosure provides a recycled powder concrete material for 3D printing construction and a preparation method therefor. The concrete material includes the following components by weight parts: cement: 1.0 part; recycled powder: 0.1-2.0 parts; recycled fine aggregate: 1.0-12.0 parts; nano titanium dioxide: 0.001-0.18 parts; high elastic modulus polyethylene fiber: 0.005-0.15 parts; redispersible latex powder: 0.002-0.1 parts; cellulose: 0.001-0.045 parts; activator: 0.01-0.30 parts; polycarboxylic acid water reducing agent: 0.005-0.2 parts; and water: 0.2-2.0 parts. According to the recycled powder concrete material for 3D printing construction, construction waste recycling powder technology is combined with 3D printing construction technology. The safety, applicability and durability of 3D printing recycled powder concrete material are further improved through the optimization of the recycled powder concrete formula. At the same time, the 3D printing recycled powder concrete material has self-cleaning functionality.

9 Claims, No Drawings

RECYCLED POWDER CONCRETE FOR 3D PRINTING CONSTRUCTION AND PREPARATION METHOD THEREFOR

CROSS REFERENCE TO RELATED APPLICATION

This is a Sect. 371 National Stage of PCT International Application No. PCT/CN2019/072847, filed on 23 Jan. 2019, which claims priority of a Chinese Patent Application No. 2018109091894 filed on 10 Aug. 2018, the contents of which hereby being incorporated by reference in its entirety for all purposes.

BACKGROUND

Field of Disclosure

The present disclosure belongs to the technical field of civil engineering materials, and relates to a recycled powder concrete for 3D printing construction and a preparation method therefor.

Description of Related Arts

In recent years, 3D printing technology has been widely used in national economic industries such as manufacturing and medical treatment. With the development of construction technology, especially unmanned construction technology, 3D printing technology has been widely used in the construction industry. Concrete materials are mainly used as 3D printing "ink", and concrete components with different shapes and structures are printed out through specific computer-controlled programs. 3D printing construction technology has obvious advantages in the preparation of heterogeneous components and unmanned construction in harsh environments. The whole process of computer programming and mechanized construction has realized the reasonable unity of architecture, structure and construction. At the same time, with the transformation and upgrading of the construction industry, 3D printed concrete buildings have a high degree of mechanization, which is an inevitable development trend of the industrialization of the construction industry in the future.

With the acceleration of urbanization and the rapid development of the national economy, the construction waste emissions in China have increased year by year, reaching 1.8 billion tons in 2017 and will remain at a high level in the future. Taking into account the inherent characteristics of construction waste, which contains a large amount of sintered red bricks and waste concrete, recycled powder with high activity can be prepared by deep grinding in combination with heating and drying of construction waste. The application of recycled powder not only absorbs a large amount of construction waste, but also alleviates the current situation of insufficient supply of cement and fly ash to a certain extent. It has high environmental and social benefits. Recycled powder material is the new development direction for the preparation of concrete in the future. Moreover, manufacturing recycled concrete from recycled powder and recycled aggregates further accelerates the resource process of construction waste, improves the utilization rate of resources, and has significant environmental and social benefits.

SUMMARY OF THE PRESENT DISCLOSURE

The present disclosure provides a recycled powder concrete for 3D printing construction and a preparation method therefor, which combines construction waste resource recycled powder technology and 3D printing unmanned construction technology, provides an application for the utilization of construction waste resource recycled powder, and has excellent environmental benefits. At the same time, the high fineness, high activity, and good water retention of the recycled powder are more suitable for the preparation of 3D printing concrete materials and ensure that the printed concrete components have excellent safety, applicability, and durability.

The present disclosure provides a recycled powder concrete material, including by weight parts: cement: 1.0 part; recycled powder: 0.1-2.0 parts; recycled fine aggregate: 1.0-12.0 parts; nano titanium dioxide: 0.001-0.18 parts; high elastic modulus polyethylene fiber: 0.005-0.15 parts; redispersible latex powder: 0.002-0.1 parts; cellulose: 0.001-0.045 parts; activator: 0.01-0.30 parts; polycarboxylic acid water reducing agent: 0.005-0.2 parts; and water: 0.2-2.0 parts.

Preferably, the recycled powder concrete material for 3D printing construction includes the following components by weight parts: cement: 1.0 part; recycled powder: 0.2-1.0 parts; recycled fine aggregate: 1.5-8.0 parts; nano titanium dioxide: 0.005-0.12 parts; high elastic modulus polyethylene fiber: 0.01-0.15 parts; redispersible latex powder: 0.005-0.05 parts; cellulose: 0.002-0.02 parts activator: 0.03-0.1 parts; polycarboxylic acid water reducing agent: 0.01-0.05 parts; and water: 0.5-1.2 parts.

More preferably, the recycled powder concrete material for 3D printing construction includes the following components by weight parts: cement: 1.0 part; recycled powder: 0.5-0.8 parts; recycled fine aggregate: 2.0-5.0 parts; nano titanium dioxide: 0.02-0.08 parts; high elastic modulus polyethylene fiber: 0.05-0.08 parts; redispersible latex powder: 0.008-0.01 parts; cellulose: 0.003-0.005 parts; activator: 0.04-0.08 parts; polycarboxylic acid water reducing agent: 0.01-0.03 parts; and water: 0.5-1.0 parts.

Preferably, the cement is portland cement or ordinary portland cement. The ordinary portland cement is cement prepared by adding 6-20% of mixed materials and an appropriate amount of gypsum to portland cement clinker. Because the ordinary portland cement contains less mixed materials and its composition is close to portland cement, the performances of the two are also close, and they can be replaced under certain conditions. If fast-hardening and high-strength concrete are required, portland cement is generally preferred, ordinary portland cement can also be used. Ordinary portland cement has a wider range of applications.

More preferably, the strength grade of the cement is not less than 32.5 grade.

Further preferably, the strength grade of the cement is 42.5 or 52.5.

Preferably, the recycled powder is fine powder with a particle size of not greater than 75 μm by grounding construction waste, and the construction waste is a mixture of waste concrete and waste bricks and tiles.

More preferably, the original strength grade of the waste concrete is not less than C20.

More preferably, the original strength grade of the waste bricks and tiles is not less than MU5.0.

More preferably, the mass percentage of the waste bricks and tiles in the construction waste is 10-90%.

Further preferably, the mass percentage of the waste bricks and tiles in the construction waste is 30-80%.

Most preferably, the mass percentage of the waste bricks and tiles in the construction waste is 50-70%.

More preferably, the impurity content in the construction waste selected for the recycled powder is less than 0.1%.

Preferably, the recycled powder is in a dry state, the dry state means that the recycled powder is placed in a drying box at 100-110° C. and dried for 24 hours, and the mass change of the active recycled powder is less than 0.1%.

More preferably, in the recycled powder, the mass percentage of the recycled powder with a particle size of not greater than 45 μm in the total recycled powder is not less than 70%.

Further preferably, in the recycled powder, the mass percentage of the recycled powder with a particle size of not greater than 45 μm to the total recycled powder is not less than 85%, and the mass percentage of the recycled powder with a particle size of not greater than 25 μm to the total recycled powder is not less than 50%.

Further preferably, in the recycled powder, the mass percentage of the recycled powder with a particle size of not greater than 30 μm to the total recycled powder is not less than 90%, and the mass percentage of the recycled powder with a particle size of not greater than 15 μm to the total recycled powder is not less than 50%.

Preferably, the recycled fine aggregate includes particles with a particle size of 0.15-5 mm by crushing construction waste, and the construction waste is waste concrete.

More preferably, the original strength grade of the waste concrete is not less than C30.

More preferably, the impurity content in the construction waste selected for the recycled fine aggregate is less than 0.1%.

More preferably, the particle size of the recycled fine aggregate ranges from 0.5 to 4 mm.

Further preferably, the particle size of the recycled fine aggregate ranges from 1 to 3 mm.

Preferably, the recycled fine aggregate is in a saturated dry surface state. It avoids the absorption of free water by the recycled fine aggregate during the mixing process, thereby affecting the actual water-cement ratio of the concrete mixture.

Preferably, the particle size of the nano titanium dioxide ($TiO_2$) is not greater than 100 nm. The appearance of the nano titanium dioxide is white loose powder.

More preferably, the particle size of the nano titanium dioxide is not greater than 75 nm.

Further preferably, the particle size of the nano titanium dioxide is not greater than 25 nm.

Preferably, an elastic modulus of the high elastic modulus polyethylene fiber ranges from 91 to 140 N/tex.

Preferably, a length of the high elastic modulus polyethylene fiber ranges from 1 to 20 mm.

Preferably, a length of the high elastic modulus polyethylene fiber ranges from 2.5 to 10 mm.

Further preferably, a length of the high elastic modulus polyethylene fiber ranges from 5 to 7.5 mm.

Preferably, the redispersible latex powder is a commonly used redispersible latex powder, which can be purchased from the market.

More preferably, the redispersible latex powder includes one of copolymer rubber powder of vinyl acetate and ethylene, ternary copolymer powder of ethylene and vinyl chloride and vinyl laurate, ternary copolymer powder of vinyl acetate and ethylene and higher fatty acid vinyl ester, vinyl acetate acid homopolymer rubber powder, and copolymer rubber powder of styrene and butadiene.

Preferably, the cellulose is hydroxypropyl methylcellulose or lignocellulose; The cellulose can ensure that the recycled powder concrete material prepared in the present disclosure has good working performance and good appearance performance.

Preferably, the activator is an alkaline activator.

More preferably, the alkaline activator is calcium hydroxide ($Ca(OH)_2$) or sodium silicate ($Na_2O*nSiO_2$).

Further preferably, the alkaline activator is calcium hydroxide. The calcium hydroxide is white powder.

Preferably, the polycarboxylic acid water reducing agent is a conventionally used polycarboxylic acid water reducing agent, which can be purchased from the market.

More preferably, the polycarboxylic acid water reducing agent is a naphthalene-based water reducing agent. Specifically, the polycarboxylic acid water reducing agent is SBTJM®-A naphthalene-based high range water reducing agent produced by Jiangsu Subote New Material Co., Ltd.

Preferably, the water is tap water.

The present disclosure further provides a preparation method of recycled powder concrete material for 3D printing construction, which measures the components according to the weight ratio of the above concrete materials, and mixes the components.

Preferably, the preparation method of recycled powder concrete material for 3D printing construction includes the following operations:

1) obtaining a premix by mixing the cement, the recycled powder, the recycled fine aggregate, the nano titanium dioxide, the redispersible latex powder, the cellulose, and the activator for a first time according to the weight ratio of the recycled powder concrete material;

2) obtaining a final mixture by adding water and polycarboxylic acid water reducing agent to the premix in operation 1) for a second mixing according to the weight ratio of the recycled powder concrete material, and adding the high elastic modulus polyethylene fiber in batches during the second mixing process, the final mixture is the required recycled powder concrete material.

Preferably, in operation 1), the recycled powder is in a dry state.

Preferably, in operation 1), the recycled fine aggregate is in a saturated dry surface state. It avoids the absorption of free water by the recycled fine aggregate during the mixing process, thereby affecting the actual water-cement ratio of the concrete mixture.

Preferably, in operation 1), the first mixing time ranges from 1 to 3 minutes. More preferably, the mixing time for the first mixing is 2 minutes.

Preferably, in operation 2), the second mixing time is not less than 2 minutes. More preferably, the mixing time for the second mixing is 3 minutes.

Preferably, in operation 2), a number of batch input times of the high elastic modulus polyethylene fiber is 3-5 times. The high elastic modulus polyethylene fiber is uniformly dispersed after being mixed.

Preferably, in operation 2), a slump of the final mixture ranges from 20 to 150 mm. More preferably, the slump of the final mixture ranges from 30 to 100 mm. Further preferably, the slump of the final mixture ranges from 40 to 50 mm.

The present disclosure further provides a use of the above recycled powder concrete material in 3D printing construction.

Preferably, the use includes 3D printing of a recycled powder concrete material to form a recycled powder concrete component for 3D printing construction.

More preferably, the 3D printing adopts a 3D printer to print layer by layer according to a specific programmed program.

The present disclosure further provides a preparation method of recycled powder concrete component for 3D printing construction, including: 3D printing the above recycled powder concrete material by using the above preparation method of recycled powder concrete material.

Preferably, a curing of the 3D printed recycled powder concrete components is normal temperature curing or standard curing.

More preferably, the curing is standard curing, the temperature of the standard curing is (20±2° C.), the humidity of the standard curing is (90±5)%, and the curing age of the standard curing is 28 days.

The present disclosure further provides a recycled powder concrete component for 3D printing construction, which is prepared by the above-mentioned preparation method.

In summary, the present disclosure provides a recycled powder concrete for 3D printing construction and a preparation method. The recycled powder and cement are used as the main cementing materials to composite nano titanium dioxide and high elastic modulus polyethylene fibers to prepare a high-quality recycled powder material for 3D printing construction, which is finally formed and cured to obtain a 3D printed recycled powder concrete component. The present disclosure has the following beneficial effects:

(1) Considering the development of the construction industry in the future, the recycled powder concrete for 3D printing construction and the preparation method therefor provided by the present disclosure combine construction waste resource recycled powder technology with 3D printing construction technology, which essentially changes the concrete material used for 3D printing construction.

(2) The recycled powder concrete for 3D printing construction and the preparation method therefor of the present disclosure obtain highly active recycled powder by deep grinding and activation of construction waste. Due to the porous requirements of the recycled powder for water and water retention, the prepared concrete has higher slump retention and early hardening properties, and is more suitable for 3D printing concrete materials. At the same time, the use of recycled powder to prepare concrete provides a new way to use construction waste as a resource, which can replace cement, reduce cement consumption, and has high environmental benefits.

(3) The present disclosure provides a recycled powder concrete for 3D printing construction and a preparation method therefor. By incorporating nano titanium dioxide, on the one hand, the mechanical properties of the concrete are improved due to the filling effect of nano particles; on the other hand, due to the photocatalytic properties of nano titanium dioxide, recycled powder concrete has a certain self-cleaning effect, so that the 3D printing recycled powder concrete has good functionality.

(4) The present disclosure provides a recycled powder concrete for 3D printing construction and a preparation method therefor. Considering the strip characteristics of the 3D printing concrete, the interface is the defective part of the 3D printing recycled powder concrete. By incorporating high elastic modulus polyethylene fiber, the interface performance between the printing strips is improved, the mechanical properties of the 3D printing recycled powder concrete are improved, and the 3D printing recycled powder concrete has excellent bending and tensile properties and overall performance, thereby ensuring the recycled powder concrete component for 3D printing construction has high safety.

(5) The present disclosure provides a recycled powder concrete for 3D printing construction and a preparation method therefor. The preparation method is simple and easy to implement, easy to promote in engineering applications. Considering the development of unmanned construction technology and resource recycling technology in civil engineering in the future, the application of the present disclosure has high environmental and social benefits.

(6) The recycled powder concrete for 3D printing construction and the preparation method therefor of the present disclosure use recycled fine aggregate and recycled powder as 3D printing concrete original materials, which realizes the "full recycling" of the main component material in concrete. The recycled fine aggregate and recycled powder are the main products of construction waste resource. The present disclosure promotes them on a large scale, which can absorb construction waste resource on a large scale, and has excellent environmental and social benefits.

DETAILED DESCRIPTION OF THE PREFERRED EMBODIMENTS

The present disclosure is illustrated in more detail by the following embodiments. It should be understood that these embodiments are only used to illustrate the present disclosure and not to limit the protection scope of the present disclosure.

The embodiments of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

It should be noted that processing equipment or devices not specifically noted in the following embodiments are all conventional equipment or devices in the field. All pressure values and ranges refer to relative pressure.

In addition, it should be understood that one or more method operations mentioned in the present disclosure are not exclusive of other method operations that may exist before or after the combined operations or that other method operations may be inserted between these explicitly mentioned operations, unless otherwise stated. It should also be understood that the combined connection relationship between one or more equipment/devices mentioned in the present disclosure does not exclude that there may be other equipment/devices before or after the combined equipment/devices or that other equipment/devices may be inserted between these explicitly mentioned equipment/devices, unless otherwise stated. Moreover, unless otherwise stated, the numbering of each method step is only a convenient tool for identifying each method step, and is not intended to limit the order of each method step or to limit the scope of the present disclosure. The change or adjustment of the relative relationship shall also be regarded as the scope in which the present disclosure may be implemented without substantially changing the technical content.

A preparation process of a recycled powder concrete component for 3D printing construction in the present disclosure is as follows:

According to the weight ratio of recycled powder concrete materials, 1.0 part of cement, 0.1-2.0 parts of recycled powder, 1.0-12.0 parts of recycled fine aggregate, 0.001-0.18 parts of nano titanium dioxide, 0.002-0.1 parts of redispersible latex powder, 0.001-0.045 parts of cellulose, and 0.01-0.30 parts of activator are measured, and are mixed for a first time for 1-3 minutes to obtain a premix. A preferred solution includes 1.0 part of cement, 0.2-1.0 parts of recycled powder, 1.5-8.0 parts of recycled fine aggregate, 0.005-0.12 parts of nano titanium dioxide, 0.005-0.05 parts of redispersible latex powder, 0.002-0.02 parts of cellulose, and 0.03-0.1 parts of activator. The most preferred solution includes 1.0 part of cement, 0.5-0.8 parts of recycled powder, 2.0-5.0 parts of recycled fine aggregate, 0.02-0.08 parts of nano titanium dioxide, 0.008-0.01 parts of redispersible latex powder, 0.003-0.005 parts of cellulose, and 0.04-0.08 parts of activator.

0.2-2.0 parts of water and 0.005-0.2 parts of polycarboxylic acid water reducing agent are measured and added into the premix for a second mixing for not less than 2 minutes. During the second mixing, 0.005-0.15 parts of high elastic modulus polyethylene fiber are added in batches for 3-5 times to obtain the final mixture. The slump of the final mixture is 20-150 mm, preferably 30-100 mm, more preferably 40-50 mm. The final mixture is the required recycled powder concrete material. The preferred solution includes 0.5-1.2 parts of water and 0.01-0.05 parts of polycarboxylic acid water reducing agent, and 0.01-0.15 parts of high elastic modulus polyethylene fiber are added in batches for 3-5 times during the second mixing process. The most preferred solution includes 0.5-1.0 parts of water and 0.01-0.03 parts of polycarboxylic acid water reducing agent, and 0.05-0.08 parts of high elastic modulus polyethylene fiber are added in batches for 3-5 times during the second mixing process.

The cement is portland cement or ordinary portland cement, and the strength grade of the cement is not less than 32.5 grade, preferably 42.5 grade or 52.5 grade. The recycled powder is fine powder with a particle size of not greater than 75 μm by grounding construction waste, and the construction waste is a mixture of waste concrete and waste bricks. The impurity content in the construction waste selected for the recycled powder is less than 0.1%, the original strength grade of the waste concrete is not less than C20, the original strength grade of the waste bricks is not less than MU5.0, and the mass percentage of the waste bricks in the construction waste is 10-90%, preferably 30-80%, more preferably 50-70%. The recycled powder is in a dry state, the dry state means that the recycled powder is placed in a drying box at 100-110° C. and dried for 24 hours, and the mass change of the active recycled powder is less than 0.1%. The mass percentage of the recycled powder with a particle size of not greater than 45 μm in the total recycled powder is not less than 70%. Preferably, the mass percentage of the recycled powder with a particle size of not greater than 45 μm to the total recycled powder is not less than 85%, and the mass percentage of the recycled powder with a particle size of not greater than 25 μm to the total recycled powder is not less than 50%. More preferably, the mass percentage of the recycled powder with a particle size of not greater than 30 μm to the total recycled powder is not less than 90%, and the mass percentage of the recycled powder with a particle size of not greater than 15 μm to the total recycled powder is not less than 50%. The recycled fine aggregate includes particles with a particle size of 0.15-5 mm by crushing construction waste, and the construction waste is waste concrete. The original strength grade of the waste concrete is not less than C30. The impurity content in the construction waste selected for the recycled fine aggregate is less than 0.1%. The particle size of the recycled fine aggregate ranges from 0.5 to 4 mm, preferably, 1-3 mm. The recycled fine aggregate is in a saturated surface dry state. The particle size of the nano titanium dioxide is not greater than 100 nm, preferably not greater than 75 nm, more preferably not greater than 25 nm. The elastic modulus of the high elastic modulus polyethylene fiber ranges from 91 to 140 N/tex. The length of the high elastic modulus polyethylene fiber ranges from 1 to 20 mm, preferably from 2.5 to 10 mm, and more preferably from 5 to 7.5 mm. More preferably, the redispersible latex powder is commonly used redispersible latex powder, preferably one of copolymer rubber powder of vinyl acetate and ethylene, ternary copolymer powder of ethylene and vinyl chloride and vinyl laurate, ternary copolymer powder of vinyl acetate and ethylene and higher fatty acid vinyl ester, vinyl acetate acid homopolymer rubber powder, and copolymer rubber powder of styrene and butadiene. The cellulose is hydroxypropyl methylcellulose or lignocellulose. The activator is an alkaline activator, preferably calcium hydroxide or water glass. The polycarboxylic acid water reducing agent is a conventionally used polycarboxylic acid water reducing agent, preferably naphthalene-based water reducing agent. The water is tap water.

Then, the prepared recycled powder concrete material is printed layer by layer using a 3D printer according to a specific programmed program to obtain a recycled powder concrete component for 3D printing construction. The recycled powder concrete component is cured. The curing method includes normal temperature curing and standard curing, preferably standard curing. The temperature of standard curing is 18-22° C., the humidity of standard curing is 85-95%, and the curing age of standard curing is 28 days.

Embodiment 1

According to the weight ratio of recycled powder concrete materials, 1.0 part of cement, 0.5 parts of recycled powder, 3.0 parts of recycled fine aggregate, 0.045 parts of nano titanium dioxide, 0.008 parts of redispersible latex powder, 0.005 parts of cellulose, and 0.04 parts of activator are measured, and are mixed for a first time for 2 minutes to obtain a premix. 0.75 parts of water and 0.015 parts of polycarboxylic acid water reducing agent are measured and added into the premix for a second mixing for 3 minutes. During the second mixing, 0.05 parts of high elastic modulus polyethylene fiber are added in batches for 4 times to obtain the final mixture. The slump of the final mixture is 40 mm, which is the required recycled powder concrete material sample 1 #. The cement is portland cement or ordinary portland cement, and the strength grade of the cement 42.5 grade. In the construction waste used in the preparation of recycled powder, waste bricks account for 50% of the mass percentage of the construction waste, the impurity content in the construction waste is less than 0.1%, the original strength grade of waste concrete is C20, and the original strength grade of the waste bricks is MU5.0. The recycled powder is in a dry state, the mass percentage of the recycled powder with a particle size of not greater than 30 μm to the total recycled powder is not less than 90%, and the mass percentage of the recycled powder with a particle size of not greater than 15 μm to the total recycled powder is not less than 50%. The particle size of the recycled fine aggregate is 2-3 mm. The impurity content in the construction waste selected for the recycled fine aggregate is less than 0.1%. The original strength grade of the waste concrete is not less than C30. The recycled fine aggregate is in a saturated surface dry state. The particle size of the nano silica is not greater than 25 nm. The elastic modulus of the high elastic modulus polyethylene fiber ranges from 91 to 140 N/tex. A length of the high elastic modulus polyethylene fiber ranges from 5 to 7.5 mm. The redispersible latex powder is a copolymer powder of vinyl acetate and ethylene. The water is tap water. The activator is calcium hydroxide. The polycarboxylic acid water reducing agent is a naphthalene-based water reducing agent.

Then, the prepared recycled powder concrete material sample 1 # is printed layer by layer using a 3D printer according to a specific programmed program to obtain a recycled powder concrete component sample 1 # for 3D printing construction. The recycled powder concrete component sample 1 # is cured. The curing method is standard curing. The temperature of standard curing is 18-22° C., the humidity of standard curing is 85-95%, and the curing age of standard curing is 28 days.

Embodiment 2

According to the weight ratio of recycled powder concrete materials, 1.0 part of cement, 0.8 parts of recycled powder, 5.0 parts of recycled fine aggregate, 0.02 parts of nano titanium dioxide, 0.01 parts of redispersible latex powder, 0.003 parts of cellulose, and 0.08 parts of activator are measured, and are mixed for a first time for 2 minutes to obtain a premix. 1 part of water and 0.03 parts of polycarboxylic acid water reducing agent are measured and added into the premix for a second mixing for 3 minutes. During the second mixing, 0.08 parts of high elastic modulus polyethylene fiber are added in batches for 5 times to obtain the final mixture. The slump of the final mixture is 50 mm, which is the required recycled powder concrete material sample 2 #. The cement is portland cement or ordinary portland cement, and the strength grade of the cement 52.5 grade. In the construction waste used in the preparation of recycled powder, waste bricks account for 60% of the mass percentage of the construction waste, the impurity content in the construction waste is less than 0.1%, the original strength grade of waste concrete is C20, and the original strength grade of the waste bricks is MU5.0. The recycled powder is in a dry state, the mass percentage of the recycled powder with a particle size of not greater than 45 μm to the total recycled powder is not less than 85%, and the mass percentage of the recycled powder with a particle size of not greater than 25 μm to the total recycled powder is not less than 50%. The particle size of the recycled fine aggregate is 1~4 mm. The impurity content in the construction waste selected for the recycled fine aggregate is less than 0.1%. The original strength grade of the waste concrete is not less than C30. The recycled fine aggregate is in a saturated surface dry state. The particle size of the nano silica is not greater than 75 nm. The elastic modulus of the high elastic modulus polyethylene fiber ranges from 100 to 120 N/tex. A length of the high elastic modulus polyethylene fiber ranges from 5.5 to 7 mm. The redispersible latex powder is a ternary copolymer powder of ethylene, vinyl chloride, and vinyl laurate. The water is tap water. The activator is water glass. The polycarboxylic acid water reducing agent is a naphthalene-based water reducing agent.

Then, the prepared recycled powder concrete material sample 2 # is printed layer by layer using a 3D printer according to a specific programmed program to obtain a recycled powder concrete component sample 2 # for 3D printing construction. The recycled powder concrete component sample 2 # is cured. The curing method is standard curing. The temperature of standard curing is 18-22° C., the humidity of standard curing is 85-95%, and the curing age of standard curing is 28 days.

Embodiment 3

According to the weight ratio of recycled powder concrete materials, 1.0 part of cement, 0.6 parts of recycled powder, 2.0 parts of recycled fine aggregate, 0.08 parts of nano titanium dioxide, 0.009 parts of redispersible latex powder, 0.004 parts of cellulose, and 0.07 parts of activator are measured, and are mixed for a first time for 3 minutes to obtain a premix. 0.5 parts of water and 0.02 parts of polycarboxylic acid water reducing agent are measured and added into the premix for a second mixing for 4 minutes. During the second mixing, 0.06 parts of high elastic modulus polyethylene fiber are added in batches for 3 times to obtain the final mixture. The slump of the final mixture is 45 mm, which is the required recycled powder concrete material sample 3 #. The cement is portland cement or ordinary portland cement, and the strength grade of the cement 52.5 grade. In the construction waste used in the preparation of recycled powder, waste bricks account for 70% of the mass percentage of the construction waste, the impurity content in the construction waste is less than 0.1%, the original strength grade of waste concrete is C20, and the original strength grade of the waste bricks is MU5.0. The recycled powder is in a dry state, the mass percentage of the recycled powder with a particle size of not greater than 30 μm to the total recycled powder is not less than 95%, and the mass percentage of the recycled powder with a particle size of not greater than 15 μm to the total recycled powder is not less than 60%. The particle size of the recycled fine aggregate is 0.2-0.9 mm. The impurity content in the construction waste selected for the recycled fine aggregate is less than 0.1%. The original strength grade of the waste concrete is not less than C30. The recycled fine aggregate is in a saturated surface dry state. The particle size of the nano silica is not greater than 20 nm. The elastic modulus of the high elastic modulus polyethylene fiber ranges from 100 to 130 N/tex. A length of the high elastic modulus polyethylene fiber ranges from 6 to 9 mm. The redispersible latex powder is vinyl acetate acid homopolymer rubber powder. The water is tap water. The activator is calcium hydroxide. The polycarboxylic acid water reducing agent is a naphthalene-based water reducing agent.

Then, the prepared recycled powder concrete material sample 3 # is printed layer by layer using a 3D printer according to a specific programmed program to obtain a recycled powder concrete component sample 3 # for 3D printing construction. The recycled powder concrete component sample 3 # is cured. The curing method is standard curing. The temperature of standard curing is 18-22° C., the humidity of standard curing is 90-95%, and the curing age of standard curing is 28 days.

Control Example 1

According to the weight ratio of recycled powder concrete materials, 1.5 parts of cement and 3.0 parts of recycled fine aggregate are measured, and are mixed for a first time for 2 minutes to obtain a premix. 0.75 parts of water and 0.015 parts of water reducing agent are measured and added into the premix for a second mixing for 3 minutes to obtain the final mixture, which is the prepared recycled powder concrete material control sample 1*. Then, the recycled powder concrete material control sample 1* is 3D printed with a 3D printer to obtain a recycled powder concrete component sample 1*.

Control Example 2

According to the weight ratio of recycled powder concrete materials, 1.0 part of cement, 0.5 parts of recycled powder, 3.0 parts of recycled fine aggregate, 0.008 parts of redispersible latex powder, 0.005 parts of cellulose, and 0.04 parts of $Ca(OH)_2$ activator are measured, and are mixed for a first time for 2 minutes to obtain a premix. 0.75 parts of water and 0.015 parts of water reducing agent are measured and added into the premix according to Embodiment 1 for a second mixing for 0.5 minutes to obtain the final mixture, which is the prepared recycled powder concrete material control sample 2*. Then, the recycled powder concrete material control sample 2* is 3D printed with a 3D printer to obtain a recycled powder concrete component sample 2*.

Control Example 3

According to the weight ratio of recycled powder concrete materials, 1.0 part of cement, 0.5 parts of recycled powder, 3.0 parts of recycled fine aggregate, 0.008 parts of redispersible latex powder, 0.005 parts of cellulose, and 0.04 parts of $Ca(OH)_2$ activator are measured, and are mixed for a first time for 2 minutes to obtain a premix. 0.75 parts of water and 0.015 parts of water reducing agent are measured and added into the premix according to Embodiment 1 for a second mixing for 3 minutes. During the second mixing, 0.05 parts of high elastic modulus polyethylene fiber are added in batches for 4 times to obtain the final mixture, which is the prepared recycled powder concrete material control sample 3*. Then, the recycled powder concrete material control sample 3* is 3D printed with a 3D printer to obtain a recycled powder concrete component sample 3*.

It can be seen from Table 1 that the cement content in concrete can be reduced through replacing cement with equal quality of recycled powder, the performance of concrete materials is not significantly affected, and the environmental benefits are good. The incorporation of high elastic modulus polyethylene fiber improves the tensile and bending strength of the cementitious material. It is calculated that the ultimate strain of cement-based cementitious materials mixed with high elastic modulus polyethylene fiber can reach more than 4%. Incorporating nano titanium dioxide into recycled powder concrete not only improves the mechanical performance of recycled powder concrete, but also has self-cleaning performance due to the photocatalytic effect of nano titanium dioxide, and the functionality is remarkable. Under the same water-binder ratio (w/b range of 0.3-0.7), compared with Control example 1, the compressive strength of Embodiment 1 is increased by 10-25%, the tensile and bending strength is increased by 40-85%, the degree of interlayer damage is reduced, and the integrity is significantly improved.

In summary, the recycled powder concrete for 3D printing construction and the preparation method provided by the present disclosure combine construction waste resource recycled powder technology with 3D printing construction technology. Through the optimization of the recycled powder concrete formula, it is ensured that the recycled powder concrete used for 3D printing construction has good mechanical performance and functionality, especially the recycled powder is deeply ground from the waste concrete and bricks in the construction waste and dried. The recycled fine aggregate is prepared by crushing waste concrete in construction waste. The promotion and application of the present disclosure provide a new application path for the resource utilization of construction waste. It also promotes the application of 3D printing construction technology in construction industry, laying a foundation for its industrial-

TABLE 1

Comprehensive performance evaluation of different types of 3D printed concrete samples

| 3D printed concrete Material type | Mechanical performance | | | Interface performance | | | Overall performance | | | Self-cleaning performance | | |
|---|---|---|---|---|---|---|---|---|---|---|---|---|
| | Low | Middle | High | Low | Middle | High | Low | Middle | High | None | Middle | Good |
| Control example 1 Recycled aggregate cement-based material | ✓ | | | ✓ | | | ✓ | | | ✓ | | |
| Control example 2 Recycled aggregate cement-based material + recycled powder | | ✓ | | ✓ | | | ✓ | | | ✓ | | |
| Control example 3 Recycled aggregate cement-based material + recycled powder + high elastic modulus polyethylene fiber | | | ✓ | | ✓ | | | ✓ | ✓ | | | |
| Embodiment 1 Recycled aggregate cement-based material + recycled powder + high elastic modulus polyethylene fiber + nano titanium dioxide | | ✓ | | | ✓ | | | ✓ | | | | ✓ |

We claim:

1. A recycled powder concrete material, comprising by weight parts:
   cement: 1.0 part;
   recycled powder: 0.1-2.0 parts;
   recycled fine aggregate: 1.0-12.0 parts;
   nano titanium dioxide: 0.001-0.18 parts;
   high elastic modulus polyethylene fiber: 0.005-0.15 parts;
   redispersible latex powder: 0.002-0.1 parts;
   cellulose: 0.001-0.045 parts;
   activator: 0.01-0.30 parts;
   polycarboxylic acid water reducing agent: 0.005-0.2 parts; and
   water: 0.2-2.0 parts;
   wherein the recycled fine aggregate includes particles with a particle size of 0.15-5 mm;
   an elastic modulus of the high elastic modulus polyethylene fiber ranges from 91 to 140 N/tex, and
   a length of the high elastic modulus polyethylene fiber ranges from 1 to 20 mm.

2. The recycled powder concrete material according to claim 1, comprising any one or more of the following:
   A1) the cement is portland cement or ordinary portland cement;
   A2) the recycled powder is fine powder with a particle size not greater than 75 μm by grounding construction waste, and the construction waste is a mixture of waste concrete and waste bricks;
   A3) a particle size of the nano titanium dioxide is not greater than 100 nm;
   A4) the cellulose is hydroxypropyl methylcellulose or lignocellulose;
   A5) the activator is an alkaline activator;
   A6) the water is tap water.

3. A preparation method of recycled powder concrete material, comprising: measuring components according to a weight ratio of a recycled powder concrete material, and mixing the components, wherein the recycled powder concrete material includes by weight parts:
   cement: 1.0 part;
   recycled powder: 0.1-2.0 parts;
   recycled fine aggregate: 1.0-12.0 parts;
   nano titanium dioxide: 0.001-0.18 parts;
   high elastic modulus polyethylene fiber: 0.005-0.15 parts;
   redispersible latex powder: 0.002-0.1 parts;
   cellulose: 0.001-0.045 parts;
   activator: 0.01-0.30 parts;
   polycarboxylic acid water reducing agent: 0.005-0.2 parts; and
   water: 0.2-2.0 parts;
   wherein the recycled fine aggregate includes particles with a particle size of 0.15-5 mm;
   an elastic modulus of the high elastic modulus polyethylene fiber ranges from 91 to 140 N/tex, and
   a length of the high elastic modulus polyethylene fiber ranges from 1 to 20 mm.

4. The preparation method of recycled powder concrete material according to claim 3, comprising:
   operation 1) obtaining a premix by mixing the cement, the recycled powder, the recycled fine aggregate, the nano titanium dioxide, the redispersible latex powder, the cellulose, and the activator for a first time according to the weight ratio of the recycled powder concrete material;
   operation 2) obtaining a final mixture by adding water and polycarboxylic acid water reducing agent to the premix in operation 1) for a second mixing according to the weight ratio of the recycled powder concrete material, and adding the high elastic modulus polyethylene fiber in batches during the second mixing process, the final mixture is the required recycled powder concrete material.

5. The preparation method of recycled powder concrete material according to claim 4, wherein in operation 1), the recycled powder is in a dry state, and the recycled fine aggregate is in a saturated surface dry state.

6. The preparation method of recycled powder concrete material according to claim 4, wherein in operation 2), a number of batch input times of the high elastic modulus polyethylene fiber is 3-5 times.

7. A preparation method of recycled powder concrete component, comprising: 3D printing a recycled powder concrete material by using the preparation method of recycled powder concrete material according to claim 3, wherein the recycled powder concrete material includes by weight parts:
   cement: 1.0 part;
   recycled powder: 0.1-2.0 parts;
   recycled fine aggregate: 1.0-12.0 parts;
   nano titanium dioxide: 0.001-0.18 parts;
   high elastic modulus polyethylene fiber: 0.005-0.15 parts;
   redispersible latex powder: 0.002-0.1 parts;
   cellulose: 0.001-0.045 parts;
   activator: 0.01-0.30 parts;
   polycarboxylic acid water reducing agent: 0.005-0.2 parts; and
   water: 0.2-2.0 parts;
   wherein the recycled fine aggregate includes particles with a particle size of 0.15-5 mm;
   an elastic modulus of the high elastic modulus polyethylene fiber ranges from 91 to 140 N/tex, and
   a length of the high elastic modulus polyethylene fiber ranges from 1 to 20 mm.

8. The preparation method of recycled powder concrete component according to claim 7, wherein a curing of the 3D printed recycled powder concrete components is normal temperature curing or standard curing.

9. A recycled powder concrete member, wherein the member is prepared by the preparation method of claim 7.

* * * * *